(12) United States Patent
Radomsky et al.

(10) Patent No.: US 6,600,899 B1
(45) Date of Patent: Jul. 29, 2003

(54) METHOD AND SYSTEM FOR TRANSMITTING SHORT MESSAGES TO A PORTABLE IR TRANSCEIVER

(75) Inventors: Israel Radomsky, Herzelia; Israel Abrams, Kfar Saba; Yossef Bruslavsky, Raanana, all of (IL)

(73) Assignee: Elpas Electro-Optic Systems Ltd., Raanana (IL)

( * ) Notice: Subject to any disclaimer, the term of this patent is extended or adjusted under 35 U.S.C. 154(b) by 0 days.

(21) Appl. No.: 09/434,727

(22) Filed: Nov. 5, 1999

(51) Int. Cl.⁷ .................................................. H04N 7/20
(52) U.S. Cl. ..................... 455/3.05; 455/3.01; 379/56.3
(58) Field of Search .................... 455/132, 466, 455/500, 91, 78, 414, 66, 69, 151.2, 151.4, 3.05, 3.01, 3.03; 340/572.1, 691.1, 572.4, 10.1, 10.3, 10.33; 379/576.3

(56) References Cited

U.S. PATENT DOCUMENTS

| | | |
|---|---|---|
| 5,247,380 A | 9/1993 | Lee et al. |
| 5,742,238 A | 4/1998 | Fox |
| 5,745,272 A | 4/1998 | Shipley |
| 6,154,139 A * | 11/2000 | Heller ...................... 340/573.4 |
| 6,211,790 B1 * | 4/2001 | Radomsky et al. ...... 340/573.4 |
| 6,225,906 B1 * | 5/2001 | Shore ...................... 340/573.4 |

OTHER PUBLICATIONS

Martin, Brian W., "WatchIt. A Fully Supervised Identification, Location and Tracking System." Proceedings of the Annual International Carnahan Conference on Security Technology, US, New York, IEEE, vol. Conf. 29, Oct. 18, 1995, pp. 306–310, XP000585871.

* cited by examiner

Primary Examiner—William Trost
Assistant Examiner—Congvan Tran
(74) Attorney, Agent, or Firm—Browdy and Neimark, P.L.L.C.

(57) ABSTRACT

In a method and system for effecting bi-directional IR data communication between an object transceiver and a reader, the object transceiver transmits successive data packets to the reader, and upon termination of a transmission of each data packet, opens a time window for receiving a transmission from the reader. The object transceiver is typically one of a plurality of object transceivers each worn by a person to whom a short message is to be transmitted and each having a respective unique ID and being able to effect autonomous transmission to the reader. In such case, each object transceiver transmits for a negligible fraction of its duty cycle thereby reducing a likelihood that two or more object transceivers will try to transmit simultaneously. Alternatively, the same objective can be realized by controlling each object transceiver to have a randomly variable duty cycle.

19 Claims, 10 Drawing Sheets

Fig 5: Timing Diagram of the DATA Decoding Circuit

METHOD AND SYSTEM FOR TRANSMITTING SHORT MESSAGES TO A PORTABLE IR TRANSCEIVER

FIELD OF THE INVENTION

This invention relates to a method and system for sending messages using low consumption portable tags that may be affixed to moving personnel or objects.

BACKGROUND OF THE INVENTION

There are many situations in which it is required to alert or send messages to moving personnel. For example, in an office or hospital environment wherein members of staff move from one room to another, it is frequently necessary to send short messages to a staff member advising him or her, for example, of an incoming telephone message or an imminent appointment. One way in which this can be done is for each staff member to wear a portable tag which contains a memory for storing a unique identity which may be read by a respective interrogation device or reader located somewhere in each room. The tag may be provided with a buzzer for alerting the wearer of an incoming message shown on a display device in the tag. The portable tag transmits its ID at regular intervals to the reader so as to allow determination thereby of which portable tags are located in its vicinity. Whenever the person bearing the tag moves into a new room, his or her identity is automatically determined for onward transmission to a central tracking computer, which keeps a record of each person's ID and his or her corresponding location.

The requirement that each portable tag must constantly transmit its ID to the interrogation device is undesirable because, by their very nature, the portable tags are miniature devices that are energized by a small internal power source such as a battery. The more data which is transmitted by each portable tag, the greater is the energy consumption and the more often the battery must be replaced.

Yet a further consideration must be borne in mind when data is transmitted using optical transceivers. For example, infrared (IR) transceivers are particularly suited for the kind of task in question and require an optically transparent path unencumbered by obstacles for effective data transmission. On the other hand, if even inadvertently optical transparency is maintained between one room and an adjacent room, then there exists the risk that a portable tag located in one room might transmit its ID to the interrogation device associated with a different, adjacent room. Such optical transparency might, for example, be the result of a dividing door between the two rooms being ajar; or owing to a window between the two rooms permitting infrared transmission therethrough.

Our co-pending Israeli Patent Application No. 126799 filed on Oct. 29, 1998 is directed to such a system which permits more than one portable tag to communicate with the interrogation device simultaneously. This desideratum clashes with the requirement to avoid collisions which, with IR transceivers is particularly onerous on account of the fact that it is difficult to detect collisions owing to the half-duplex communications protocol inherent in IR transmission. Such a requirement is met by assigning time slots for each of the IR transceivers and using polling techniques, thus allowing the interrogation device to address a portable tag at will by including the portable tag's ID in the data stream transmitted thereby.

Such a system is thus highly versatile but at the cost of requiring a sophisticated data communications protocol.

Furthermore, since a portable tag can be addressed at will, it must always be ready to receive data transmitted thereto by the interrogator. This requirement can be met by making the portable tag constantly active. However, bearing in mind that the portable tag is battery powered, this imposes an unacceptable burden on the battery. Alternatively, battery power may be conserved if the portable tag is normally dormant. However, in this case the portable tag must be "awakened" by the interrogator before data can be received by the portable tag. This places yet a further overhead on the circuitry in the portable tag's receiver, thereby increasing its cost.

When short messages are required to be transmitted to the tag in order to alert the bearer thereof to take certain action, for example, the quantity of data that needs to be transmitted to the portable tag is minimal. It is then possible to dispense with the requirement for independent free addressing of the portable tag. In such cases, the overhead associated with the sophisticated data communications in the system described in Israeli Patent Application No. 126799 may not be warranted.

SUMMARY OF THE INVENTION

It is thus an object of the present invention to provide a method for keeping track of objects in which the drawbacks described above are significantly reduced or eliminated.

It is a particular object of the present invention to provide an improved communications protocol suitable for use with IR transceivers allowing near simultaneous two-way communication between an interrogation device and a plurality of IR transceivers.

In accordance with a broad aspect of the invention there is provided a method for effecting bi-directional IR data communication between an object transceiver and a reader, the method comprising the following steps carried out by the object transceiver:

(One) transmitting successive data packets to the reader, (Two) upon termination of a transmission of each of said data packets, opening a time window for receiving a transmission from the reader.

In accordance with a further aspect of the invention there is provided an object transceiver adapted for bi-directional IR data communication with a reader, the object transceiver comprising:

a transmitter for transmitting successive data packets to the reader, and a timer responsive to termination of a transmission of each of said data packets, for opening a time window for receiving a transmission from the reader.

The invention also encompasses a reader for sending a message using IR data communication to a portable object transceiver, said reader comprising:

a receiver for receiving a transmission of a data packet from the portable object transceiver, and a transmitter for sending the message to the portable object transceiver during a narrow time window opened thereby.

Furthermore, the invention encompasses a system comprising a server connected to a plurality of readers for sending a message using IR data communication to a portable object transceiver, wherein the server is adapted to:

(One) locate a respective one of said readers in communication with the portable object transceiver, and (Two) send the message from the server to the respective reader for onward transmission to the portable object transceiver during a narrow time window opened thereby.

The object transceiver may be a portable battery-powered badge worn by movable personnel to whom short messages are to be communicated. In order to reduce the risk of data collision between different badges, each badge transmits for only 2 ms, successive data being transmitted after 60 seconds if the badge is stationary. In such case, the likelihood of two badges attempting to transmit during the identical 2 ms period is clearly negligible. When the badges move, the time interval between successive transmissions is randomly varied between 3 and 5 seconds. Thus, here too, the risk of two or more badges attempting to transmit within the same time slot may be sufficiently reduced. Obviously, conventional data collision techniques requiring re-allocation of time slots and re-transmission of data may be employed in the event that, notwithstanding efforts to the contrary, two different badge IDs are transmitted simultaneously.

BRIEF DESCRIPTION OF THE DRAWINGS

In order to understand the invention and to see how the same may be carried out in practice, a preferred example of the communications protocol will now be described with reference to a portable identity badge, by way of non-limiting example only, with reference to the accompanying drawings, in which.

DETAILED DESCRIPTION OF A PREFERRED EMBODIMENT

Figure 1:
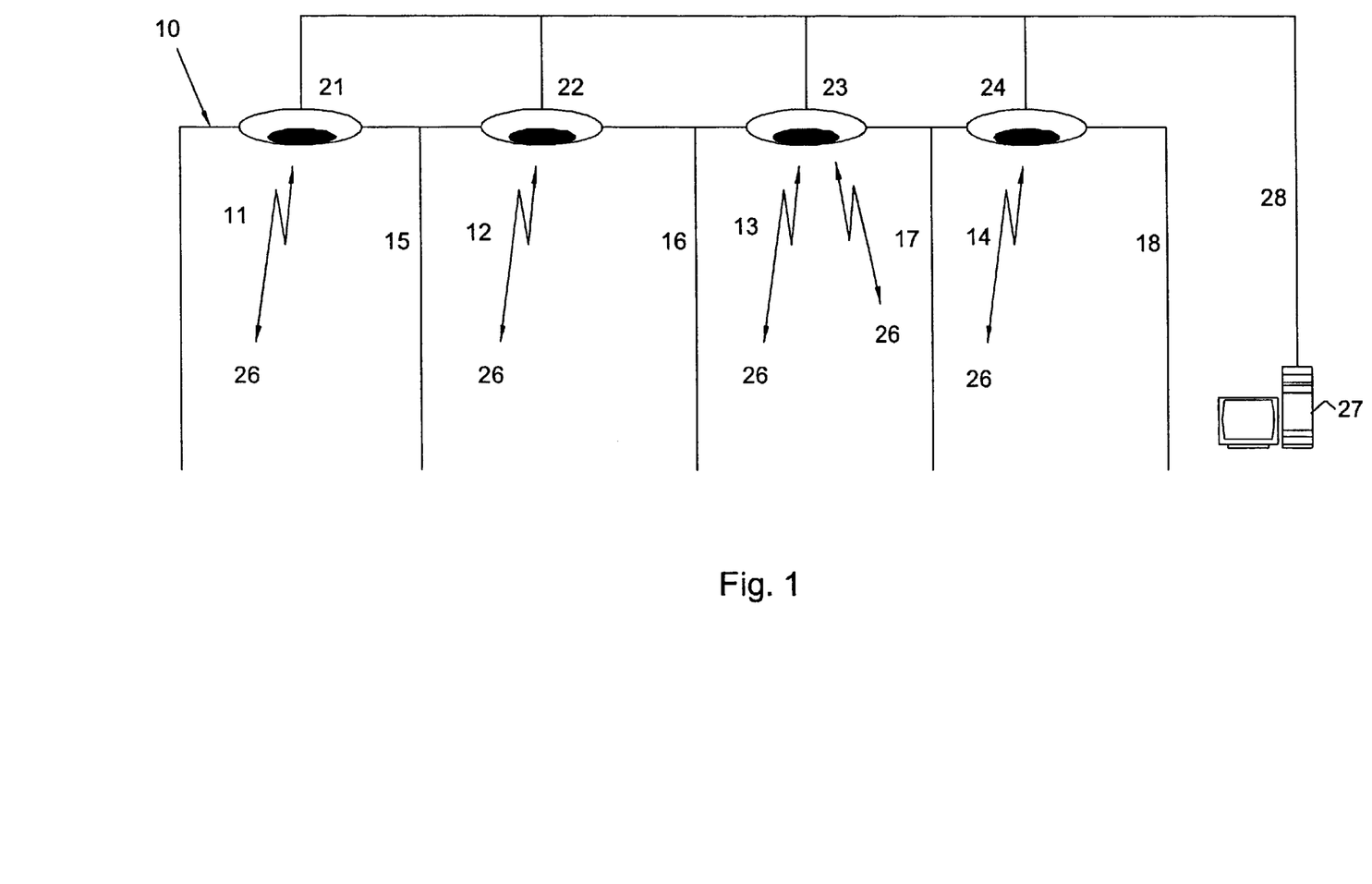
FIG. 1 shows pictorially a geographical area split into adjacent rooms each containing a reader and one or more portable badges for carrying out the method according to the invention.

FIG. 1 shows a pictorial representation of a geographical area depicted generally as 10 comprising four separate and mutually adjacent rooms 11, 12, 13 and 14. In each of the four rooms 11 to 14 there is mounted on the ceiling a corresponding reader 21, 22, 23 and 24 constituting a location transceiver which allows transmission and reception of data using IR transmission. Also shown in each room one or more portable IR transceivers 26 which can transmit data to a nearby reader as well as receiving data therefrom. A server 27 is connected to the four IR readers 21, 22, 23 and 24 via a LONTALK network 28 and is responsive to signals generated by the readers 21, 22, 23 and 24 for reception and monitoring the transmissions of the IR badges. LONTALK is a registered trademark of the Echelon Corporation.

Figure 2A:
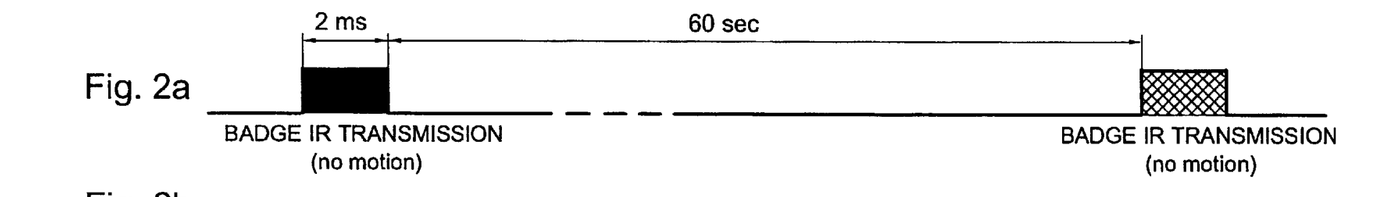
FIGS. 2a to 2d show pictorially details of a data communications protocol associated with the portable badge transceiver according to the invention.
Figure 2B:
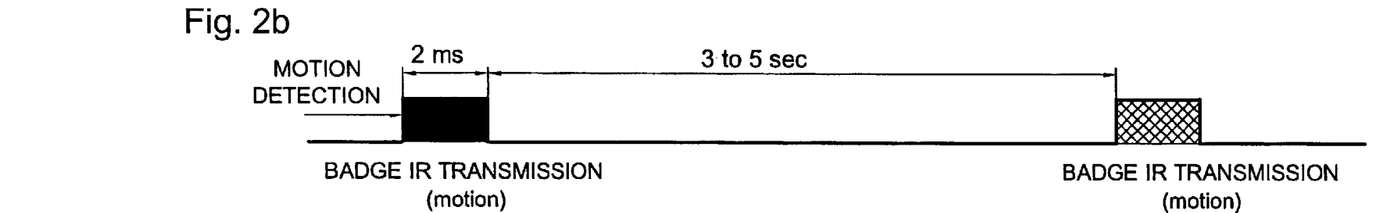

FIGS. 2a to 2d show pictorially details of a data communications protocol associated with the portable badge transceiver according to the invention. As shown in FIG. 2a, when the badge is stationary, a 2 ms pulse is transmitted by the badge once every 60 seconds. This signal serves merely to inform the readers 21 to 24 that the badge is active and within range. As shown in FIG. 2b, when the badge moves, the frequency transmission is increased so that a 2 ms pulse is transmitted once every three to five seconds. In both cases, the data pulse transmitted by the badge is encoded within the badge ID so that the reader can determine from which badge the data is transmitted and thereby establish the location thereof. By varying the data transmission rate from sparse transmission when the badge is motionless to more frequent transmission when it is subject to movement, battery consumption may be significantly reduced when the badge is dormant for extended periods of time.

Owing to the very small time slot during which a stationary badge transmits as a proportion of the overall cycle between successive transmissions, the likelihood of two stationary badges attempting to transmit during the identical 2 ms period is negligible. When the badges move, the time interval between successive transmissions is randomly varied between 3 and 5 seconds. Thus, here too, the risk of two or more badges attempting to transmit within the same time slot may be sufficiently reduced. Obviously, conventional data collision techniques requiring re-transmission of data may be employed in the event that, notwithstanding efforts to the contrary, two different badges are transmitted simultaneously.

Figure 2C:
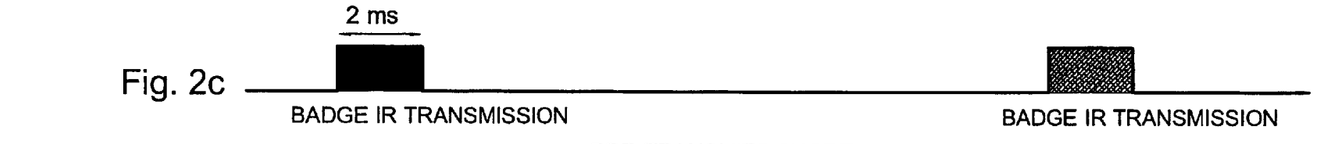
Figure 2D:
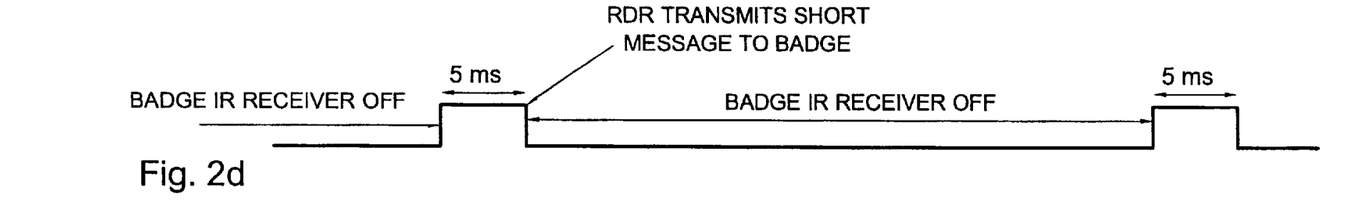

FIGS. 2c and 2d show that immediately following data transmission by the badge, there is opened a time window of duration 5 ms for allowing reception of data transmitted to the badge by a reader. Thus, a reader receiving data transmitted by a badge may, if it so desires, respond within the short time window without the need for polling as is done in the system described, for example, in our above-mentioned co-pending Israeli Patent Application No. 126799. This results in a simpler data communications protocol albeit at the price of reduced versatility, since only immediately following data transmission by a badge, is it possible for a reader to transmit thereto. However, there are many occasions where the reduction in versatility is acceptable.

Figure 3:
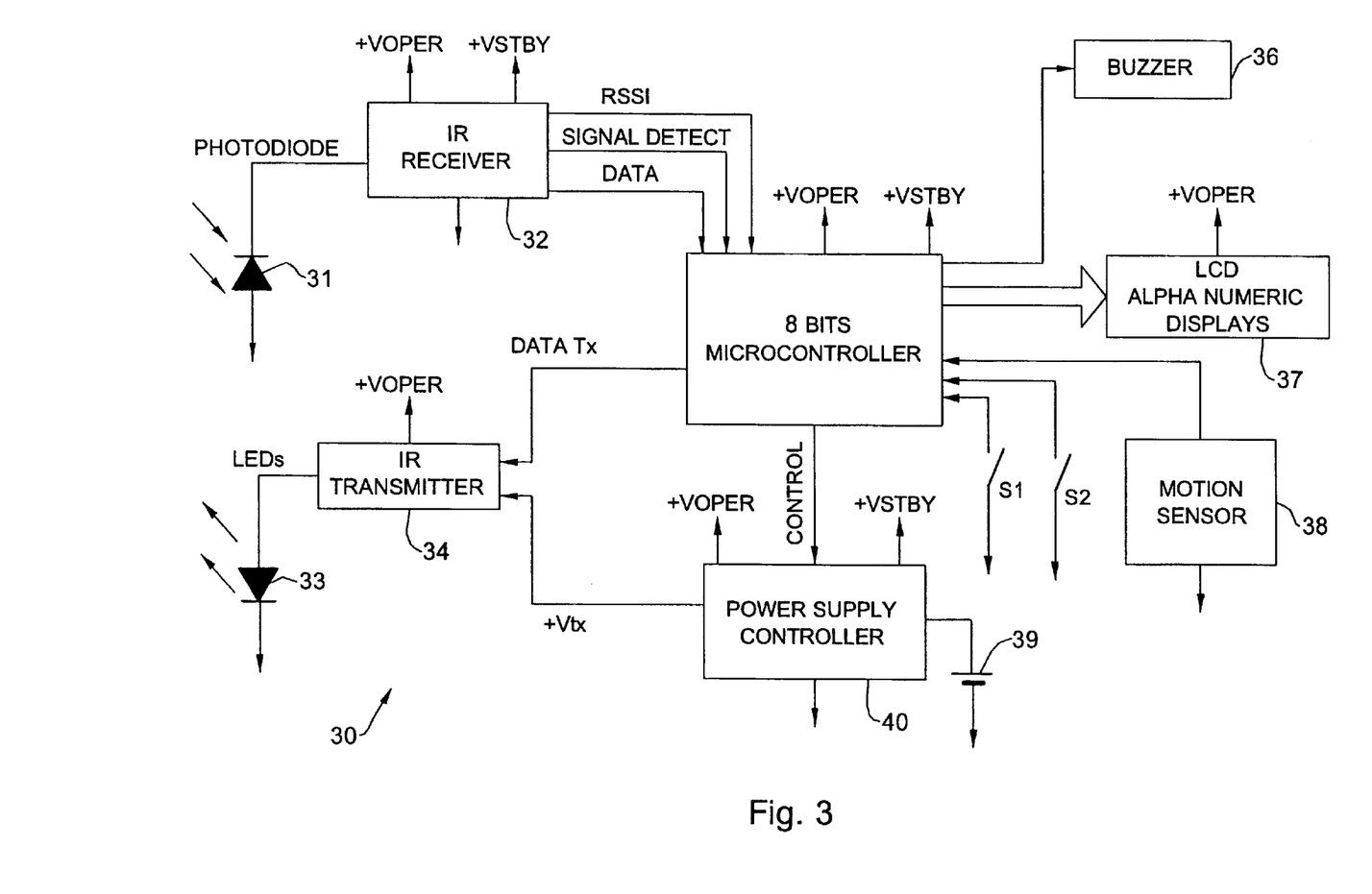
FIG. 3 is a block diagram showing functionally an IR transceiver for use in the badges illustrated in FIG. 1.

FIG. 3 shows a block diagram of a badge depicted generally as 30 and including an IR photodiode 31 connected to an IR receiver 32 for receiving an IR signal form one of the ceiling-mounted readers 21, 22, 23 and 24 shown in FIG. 1. An array of LEDs 33 is connected to an IR transmitter 34 for transmitting and IR signal to one of the readers 21, 22 and 23. A micro-controller 35 is coupled to both the IR receiver 32 and the IR transmitter 34 and operates in accordance with a stored instruction set defining communications protocols allowing short messages to be communicated between the badge and reader. The various communications protocols are described in detail below with particular reference to FIGS. 6a, 6b and 9a to 9d of the drawings. It will be understood from the timing diagrams shown in these figures that the micro-controller 35 functions as a timer that is responsive to termination of data packets transmitted thereby, for opening a time window for receiving a transmission from the reader.

Coupled to the micro-controller 35 is a buzzer 36 and a display 37 as well as an array of manual switches S1 and S2 allowing pre-programmed functions to be manually selected in accordance with the instruction set stored in the micro-controller 35. The buzzer 36 and the display 37, in addition to the manual switches S1 and S2, allow customization of the badge for specific applications. Thus, for example, the badge can serve as a paging device for displaying a short message upon receiving a remote communication and sounding the buzzer so as to alert the owner of an awaiting message. A motion sensor 38 is coupled to the micro-controller 35 for feeding thereto a motion signal when the badge is moved. This signal causes the badge to transmit its data at a higher rate and prolongs battery life, since only relatively sparse transmission is required when the badge is stationary. The badge circuitry is powered by a 3 volt lithium battery 39 connected to the micro-controller 35 and the IR transmitter 42 via a power supply controller 40.

Figure 4:
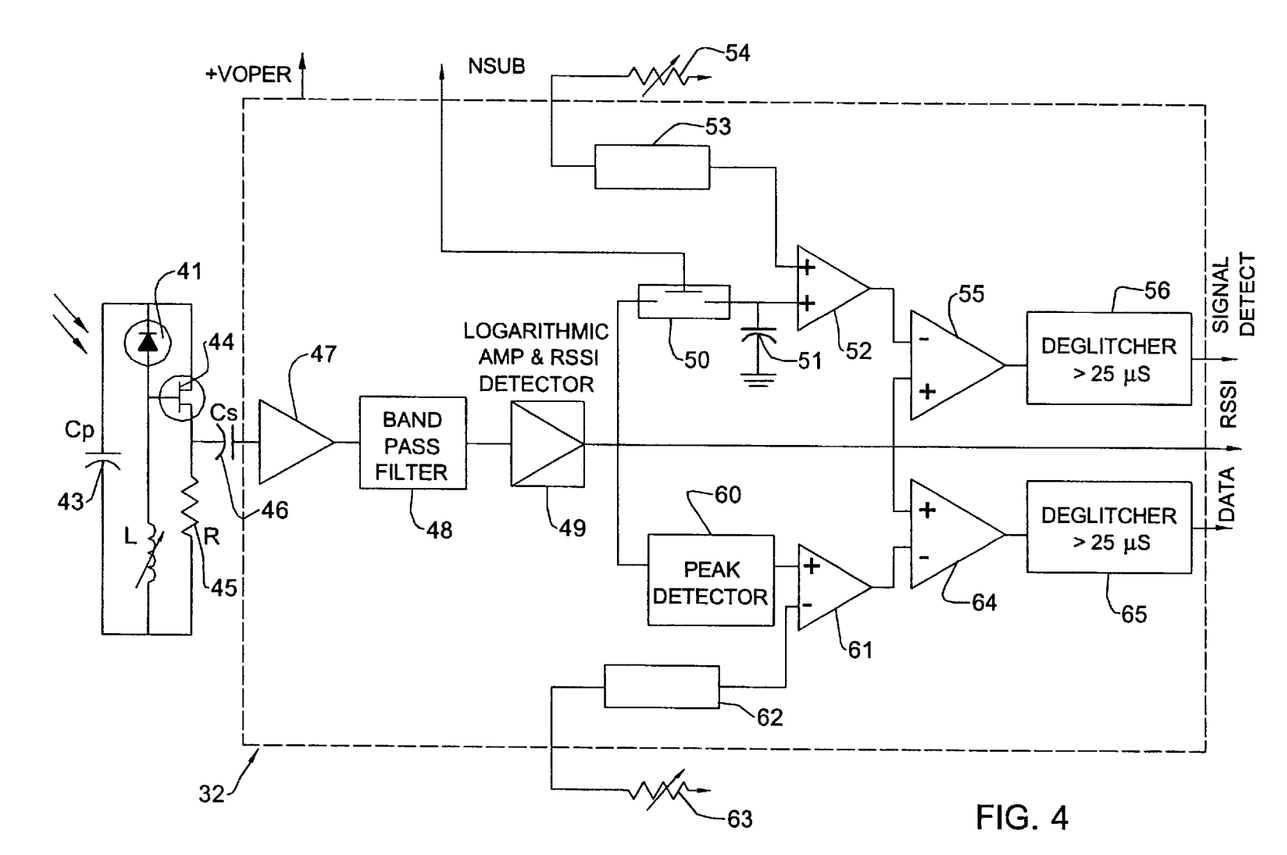
FIG. 4 shows schematically a detail of an IR transceiver for use in the badges illustrated in FIG. 1.

FIG. 4 shows in greater detail the circuitry associated with the IR receiver 32 used in the badge 30. A similar circuit is likewise employed in the ceiling-mounted IR transceivers 21, 22, 23 and 24 shown in FIG. 1. Thus, in both cases an IR photodiode array 41 is connected to a tuned resonant circuit comprising an tuned coil 42 and a capacitor 43 for applying data to the gate of a MOSFET 44. The source of the MOSFET 44 is connected to the capacitor 43 via a resistor 45 and is fed via a coupling capacitor 46 to the IR transceiver 32 having therein a memory (not shown) for allowing data to be stored therein and to be extracted, or read, therefrom. The coupling capacitor 46 blocks the DC level but allows data to pass through to a low noise linear amplifier 47 operating at a basic frequency 455 KHz and having an output coupled to a band pass filter 48 having a bandwidth of 32 KHz. The resulting carrier signal is fed to the input of a logarithmic amplifier and Received Signal Strength Indicator (RSSI) 49 allowing the signal strength to be displayed in suitable form. The signal passed by the RSSI 49 includes both data and noise and it is obviously important to filter out the noise so that the IR receiver 32 does not receive false signals. Only those signals which are determined to be genuine data signals are demodulated so as to extract the data.

To this end there is coupled a noise subtract unit 50 an output of which is fed to a capacitor 51 operating as a noise integrator whose output is fed to a first input of a summing amplifier 52. A second input of the summing amplifier 52 is connected to a variable threshold generator 53 whose threshold may be set by a variable resistor 54 external to the IR receiver 32. The output of the summing amplifier 52, corresponding to the sum of the average noise and the noise threshold, is fed to the inverting input of a comparator 55 whose non-inverting input is fed to the RSSI signal produced by the amplifier and detector 49. The output of the comparator 55 is fed to a deglitcher 56 which suppresses any pulse whose time duration is less than 25 μs and thus constitutes spurious glitches rather than actual signal data. Thus, when a signal is detected at the output of the deglitcher 56, corresponding to an actual received signal, the corresponding data associated therewith is extracted and detected.

To this e, the RSSI signal is fed to a peak detector 60 which measures its peak value and feeds it to a first, summing input of a summing amplifier 61 having a second, subtracting input connected to a variable threshold generator 62 whose threshold may be set by a variable resistor 63 external to the IR receiver 32. The output of the summing amplifier 61, corresponding to the difference between the peak value of the RSSI signal and the threshold, is fed to the inverting input of a comparator 64 whose non-inverting input is fed to the RSSI signal produced by the amplifier and detector 49. The output of the comparator 64 is fed to a deglitcher 65 which suppresses any pulse whose time duration is less than 25 μs and thus constitutes spurious glitches rather than actual data. The waveforms associated with the decoded data and the RSSI signals are shown in FIGS. 5a and 5b of the drawings.

Figures 5, 5A:
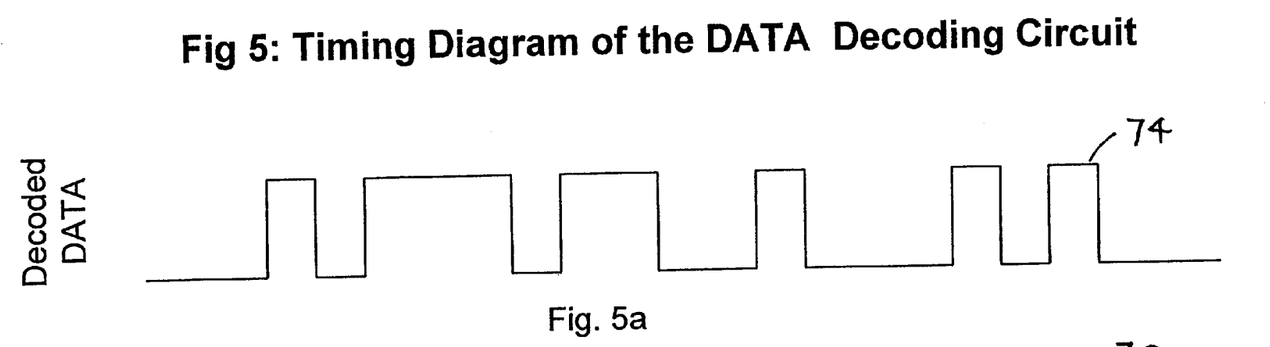
FIGS. 5a and 5b are timing diagrams of a data decoding circuit used in the IR receiver of the Badge.
Figure 5B:
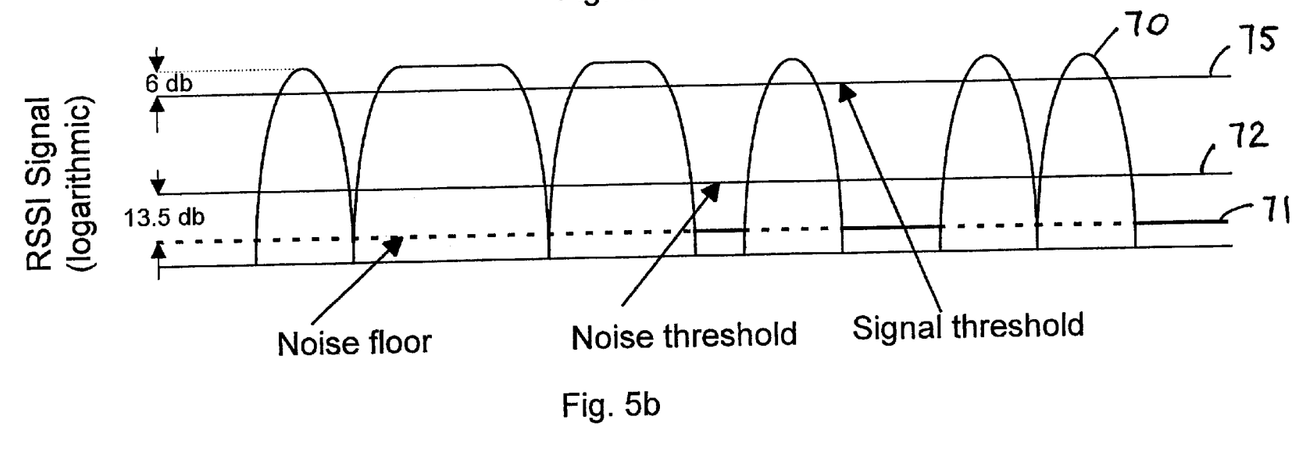

FIGS. 5a and 5b show timing diagrams of a data decoding circuit used in the IR receiver 32 of the Badge 30. In order to understand these diagrams, reference is again made to FIG. 4 showing a detail of the IR receiver 32. The RSSI signal shown as 70 in FIG. 5a is taken from the output of a logarithmic amplifier thus accounting for its irregular shape. The average noise derived at the output of the noise integrator is shown in FIG. 5a as a noise floor 71, whilst an upper noise limit 72 is shown as a 13.5 dB offset from the noise floor 71. The 13.5 dB offset is set by the noise threshold generator 53 and the external potentiometer 54 shown in FIG. 4. That is to say, the upper noise limit 72 defines the largest signal which could conceivably be noise: anything larger is accepted as genuine data. For so long as the RSSI signal 70 is greater than the noise threshold 72, the data signal derived from the peak detected RSSI signal is demodulated to produce the pulse train shown as 74 in FIG. 5b. The pulse train 74 is derived by clipping the RSSI signal 70 by 6 dB, this being the peak threshold set by the threshold generator 62 and the external potentiometer 63 shown in FIG. 4 and shown as 75 in FIG. 5a. The threshold 75 is subtracted from the RSSI signal 70 by the summing amplifier 61 which operates as a subtractor.

Figure 6A:
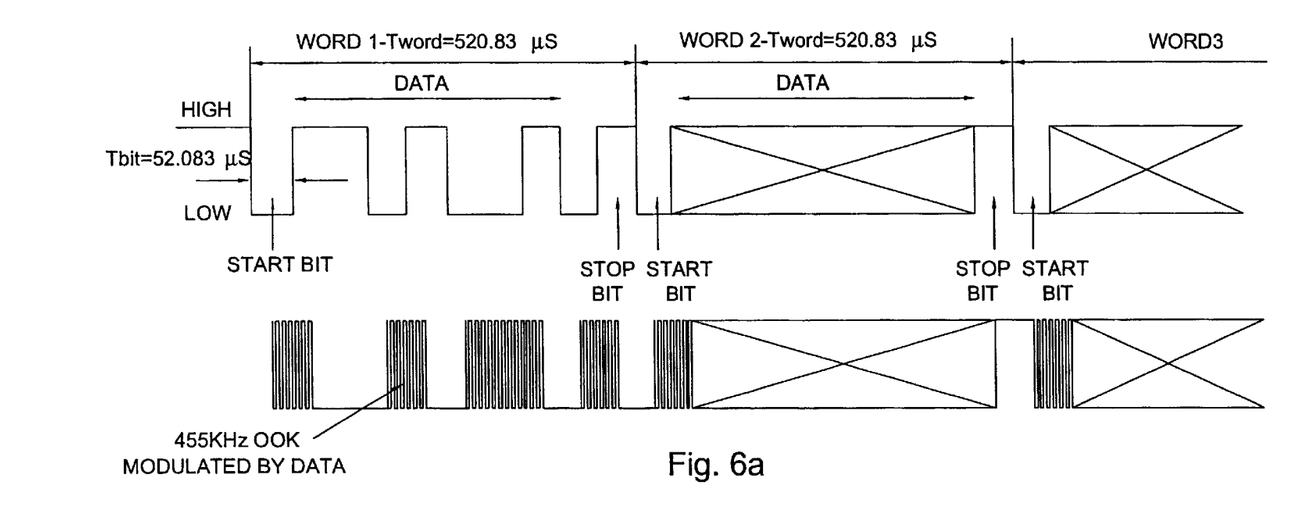
FIGS. 6a and 6b show details of the modulation scheme and reader transmission protocol.

FIGS. 6a shows the IR modulation scheme employing on-off keying (OOK) modulation of the 455 KHz pulse train constituting the modulated carrier transmitted by the reader. A high logic level constituting logic "1" is thus represented by an absence of data whereas a low logic level (logic "0") results in a modulated pulse being transmitted by the reader to the badge.

Figure 6B:
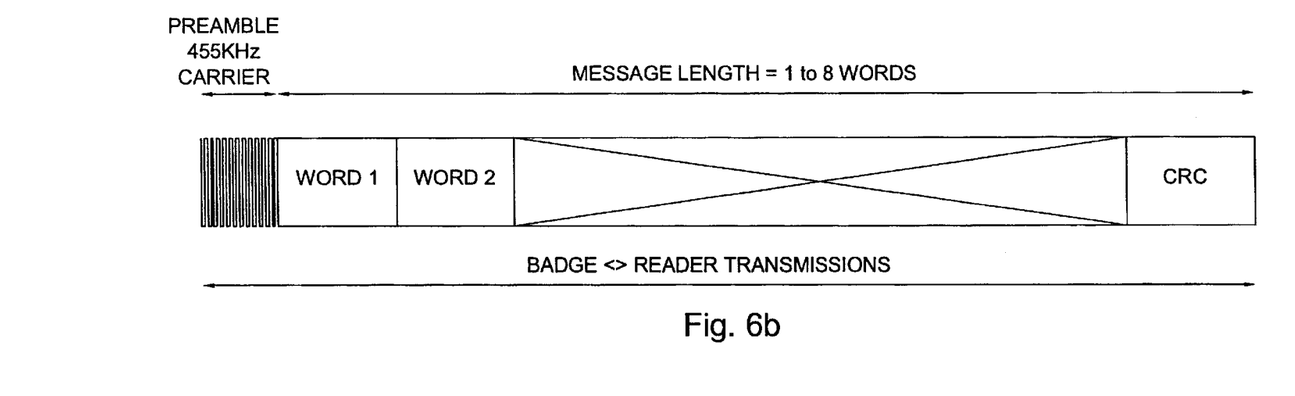

FIG. 6b shows a message transmitted by the badge to the reader comprising a 455 KHz carrier preamble followed by a plurality of data words. A similar data message is sent by the reader to the badge comprising a short preamble in the form of a 455 KHz carrier signal followed by words of actual data.

Figure 7:
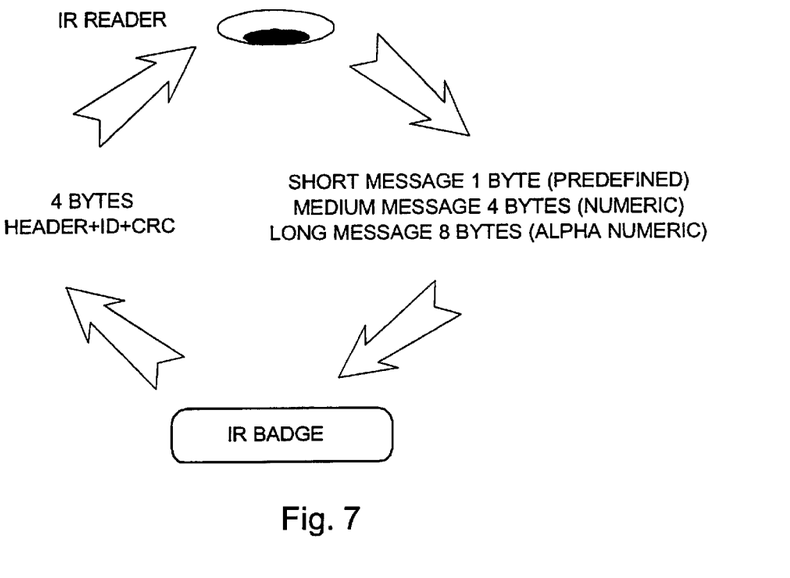
FIG. 7 shows pictorially varying length messages transmitted by the Reader to the Badge.

FIG. 7 shows pictorially varying length messages transmitted by the reader to the badge. Thus, the reader contemplates three types of messages having different lengths. Specifically, a short length message of one predefined byte allows for 256 predefined codes to be sent from the reader to the badge. A lookup table (not shown) in the badge translates the received code to an appropriate message for display on the display unit 37 (shown in FIG. 3). A medium length message has a length of four bytes, allowing for 16 characters to be transmitted to the badge. This is primarily intended for the transmission of numeric characters such as telephone numbers and the like. A long length message having a length of 8 bytes allows for the transmission of alphanumeric messages from the reader to the badge. The badge is programmed to send messages comprising a header followed the badge's ID followed by a checksum (CRC) occupying four bytes in total.

Figure 8:
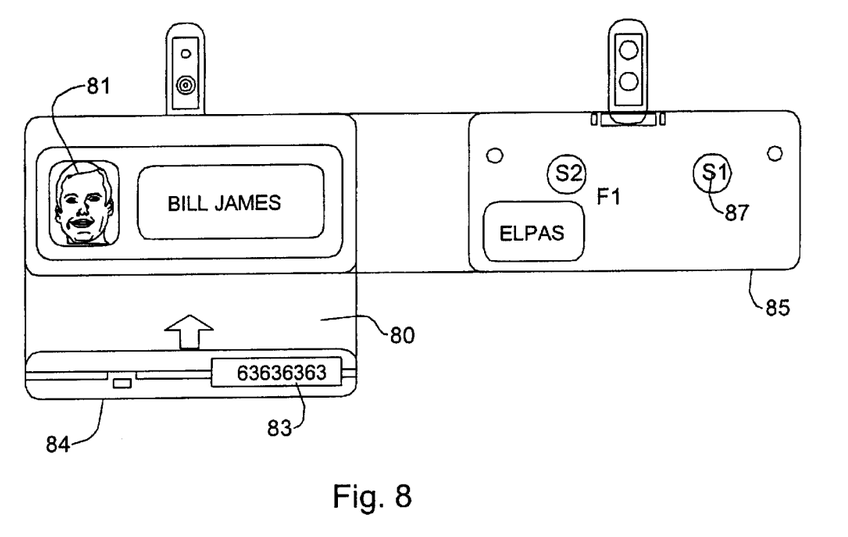
FIG. 8 shows pictorially front and rear views of the Badge.

FIG. 8 shows pictorially front, side and rear views of the badge. On a front surface 80 is affixed a photograph 81 of the bearer of the badge and a name tag 82. A display 83 mounted on a side surface 84 allows for the display of up to eight characters. On a rear surface 85 of the badge are mounted function buttons 86 and 87 corresponding to the switches S1 and S2 shown in FIG. 3.

Figure 9A:
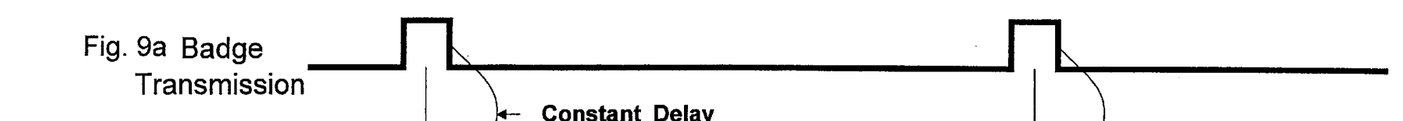
FIGS. 9a to 9e are timing diagrams showing successive frames of data transmitted by the Badge to the Reader.
Figure 9B:
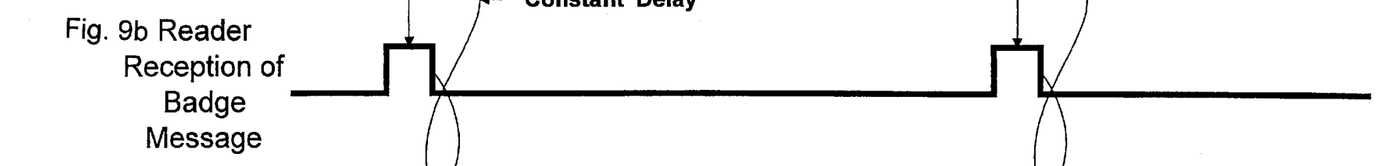
Figure 9C:
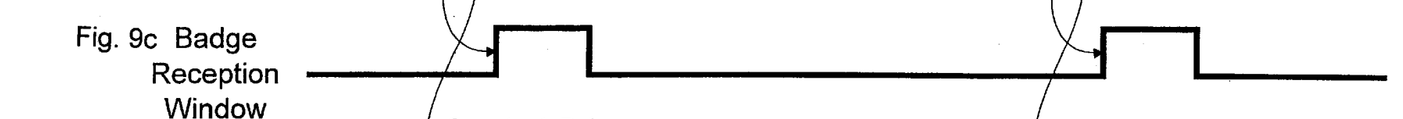
Figure 9D:
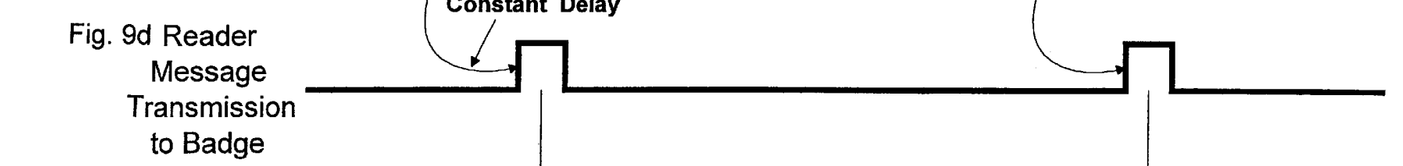
Figure 9E:
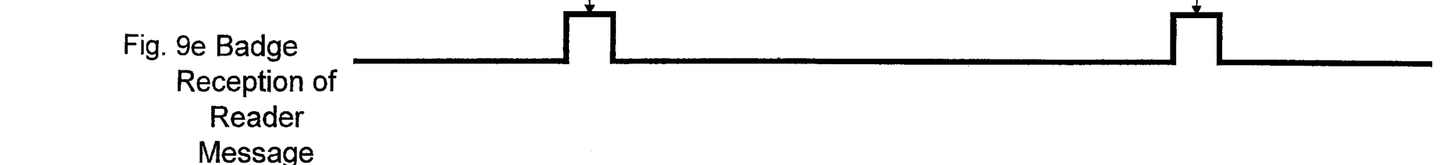

FIGS. 9a to 9e are timing diagrams showing successive frames of data transmitted by the badge to the reader. Thus, there are shown in FIGS. 9a and 9b successive pulses transmitted by the badge and received by the reader. FIG. 9c shows the time window of 5 ms duration which follows each pulse transmitted by the badge after a constant delay. FIG. 9d shows successive pulses corresponding to data transmitted by the reader for reception by the badge during the 5 ms time window, whilst FIG. 9e shows the same pulses received by the badge.

Figure 10:
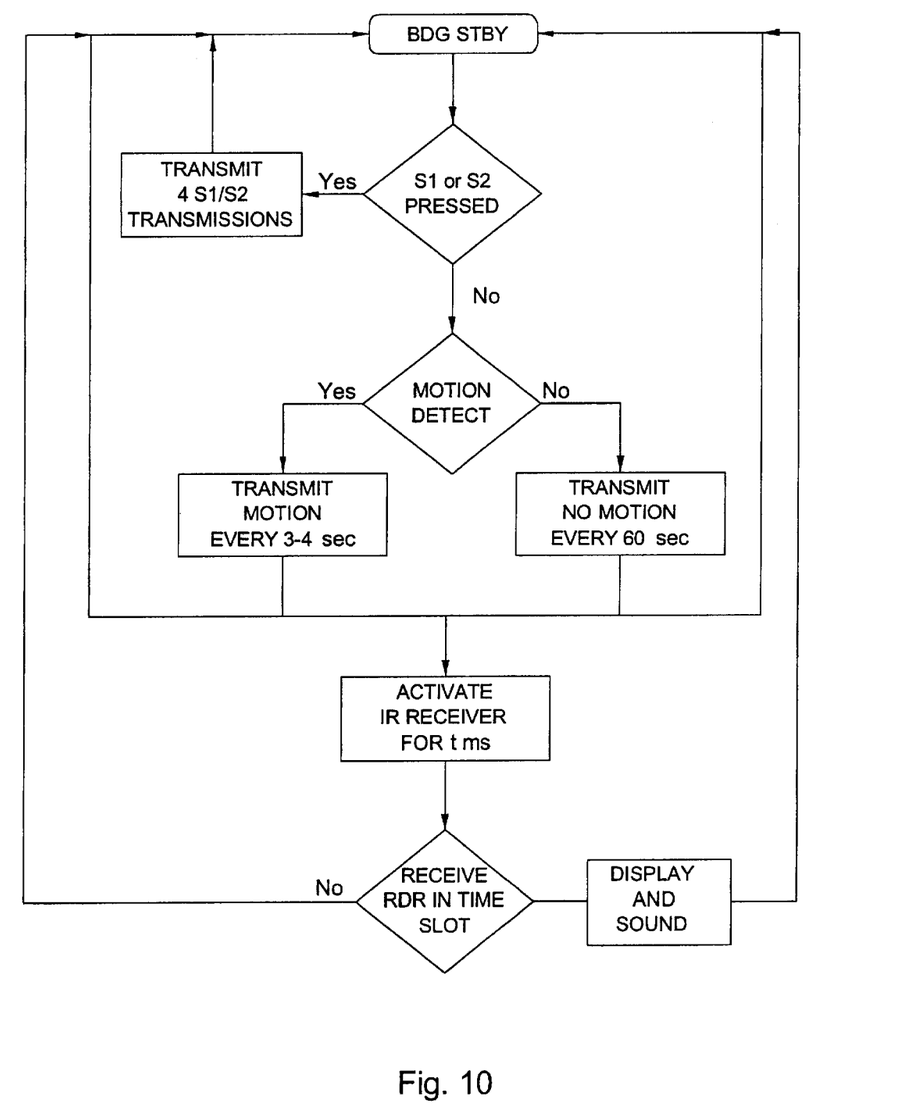
FIG. 10 is a flow diagram showing details of a communications protocol for use by the badge.

FIG. 10 is a flow diagram showing the principal operating steps carried out by the badge during bi-directional communication with the reader. At the start of this procedure, the badge is on standby. If either of the switches S1 or S2 (corresponding to the function buttons 86 and 87 in FIG. 8) is depressed, a series of four pulses is transmitted by the badge encoding an identity of which of the two switches has been pressed. Otherwise, the badge checks whether a motion detect signal has been produced by the motion sensor and, if so, transmits a pulse every 3 to 4 seconds to the reader. In the absence of motion being detected, an "I'm alive" pulse is transmitted once every 60 seconds. By varying the data transmission rate from sparse transmission when the badge is motionless to more frequent transmission when it is subject to movement, battery consumption may be significantly reduced when the badge is dormant for extended periods of time.

A fixed delay after transmitting data to the reader, the IR receiver 32 within the badge is activated for a time window of 5 ms duration for receiving data transmitted to the badge from a reader. In the absence of any such data being received, the badge returns to standby mode. Otherwise, the received data is displayed and the buzzer is activated to alert the bearer of the badge to the arrival of a message. Thereafter, the badge returns to standby mode.

Figure 11:
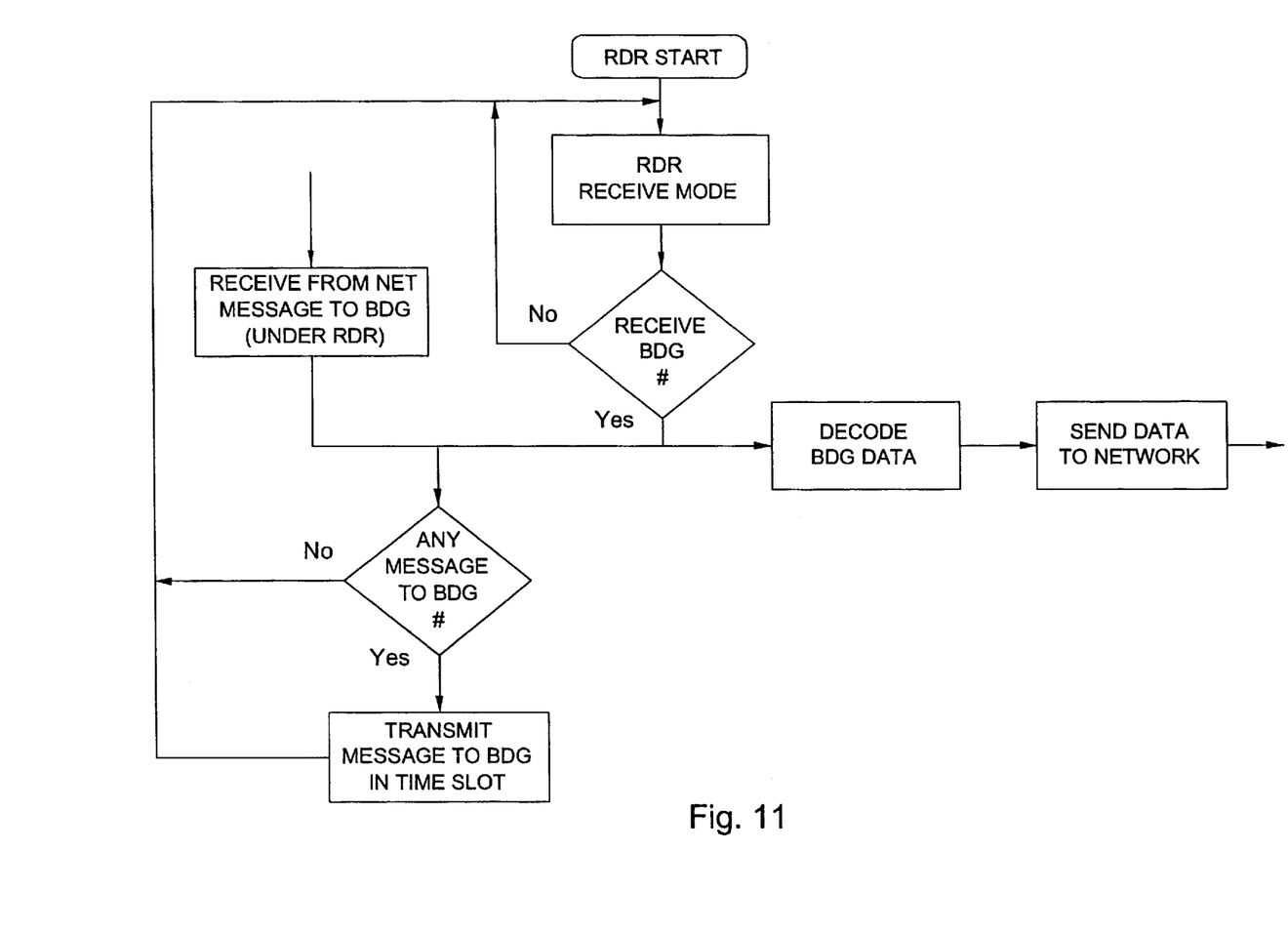
FIG. 11 is a flow diagram showing details of a communications protocol for use by the reader.

FIG. 10 is a flow diagram showing the principal operating steps carried out by the reader during bi-directional communication with the badge. Thus, initially, the reader is in "receive mode" and remains so until a message is received. Such a message may be transmitted by a badge or, alternatively, fed to the reader via the network 28 (shown in FIG. 1). In either case, the received data is decoded and fed via the network 28 to the server 27 for processing. The reader then checks whether there is any data to be transmitted to the badge and, if so, transmits the message data in the 5 ms time window opened by the badge following data transmission thereby. In the absence of any data to be transmitted to the badge, or following the transmission of any data to the badge, control returns to the start and the reader reverts to "receive mode".

Thus the invention provides a very simple communications protocol for use by a portable IR badge allowing a badge to receive data for only a short time following transmission of data by the badge. Owing to the sparse transmission rate when the badge is stationary and the fact that a badge can only be addressed by a reader following transmission by the badge to the reader, the badge can be active continually. This obviates the need for "wake up" circuitry and simplifies the IR receiver in the badge.

It will further be appreciated that whilst the communications protocol has been described with particular reference to its implementation in a portable ID badge for tracking movement of a person and allowing short messages to be transmitted thereto, it may equally well be employed in other applications and is clearly not restricted to such a system.

In the method claims that follow, alphabetic characters used to designate claim steps are provided for convenience only and do not imply any particular order of performing the steps.

What is claimed is:

1. A method for effecting bi-directional IR data communication between an portable transceiver and a reader, the method comprising the following steps carried out by the portable transceiver:

(a) initiating asynchronous transmissions of successive data packets to the reader at a rate that is dependent on whether the portable transceiver is stationary or moving, (b) upon termination of a transmission of each of said data packets, opening a time window for receiving a transmission from the reader and enabling reception of a message therein, and (c) upon termination of said time window, disabling reception of data.

2. The method according to claim 1, wherein:

the portable transceiver is one of a plurality of portable transceivers each worn by a person to whom a short message is to be transmitted and each having a respective unique ID and being able to effect autonomous transmission to the reader, and in step (a) each portable transceiver transmits for a negligible fraction of its duty cycle thereby reducing a likelihood that two or more portable transceivers will try to transmit simultaneously.

3. The method according to claim 1, wherein:

the portable transceiver is one of a plurality of portable transceivers each worn by a person to whom a short message is to be transmitted and each having a respective unique ID and being able to effect autonomous transmission to the reader, and in step (a) each portable transceiver has a randomly variable duty cycle thereby reducing a likelihood that two or more portable transceivers will try to transmit simultaneously.

4. A method for use with a data communications network comprising a server connected to a plurality of readers in order to send a message using IR data communication to a portable transceiver operating according to claim 1, said method comprising the following steps carried out by at least one of said readers:

(a) awaiting receipt of a transmission from said portable transceiver of a data packet, and (b) sending the message to the portable transceiver from the respective reader in communication with the portable transceiver during a time window opened thereby so as to be dependent on the transmission from the portable transceiver for allowing communication therewith.

5. The method according to claim 4, wherein the message is sent via the server and there are further included the step of:

locating the respective reader in communication with the portable transceiver, and sending the message from the server to the respective reader for onward transmission to the portable transceiver.

6. The method according to claim 1, further including randomly varying initiation of said transmission within a duty cycle of the transmitter thereby reducing a likelihood that two or more portable transceivers will try to transmit simultaneously.

7. A portable transceiver adapted for bi-directional IR data communication with a reader, the portable transceiver comprising:

a motion sensor for producing a motion detect signal upon movement of the portable transceiver, a transmitter coupled to the motion sensor for transmitting successive data packets to the reader at a rate that is dependent on whether the portable transceiver is stationary or moving;

a timer responsive to termination of a transmission of each of said data packets, for opening a time window for receiving a transmission from the reader, and a receiver for receiving messages only during said time window.

8. The portable transceiver according to claim 7, including a micro-controller for controlling the transmitter to transmit for a negligible fraction of a duty cycle thereof, thereby reducing a likelihood that two or more portable transceivers will try to transmit simultaneously.

9. The portable transceiver according to claim 7, including a micro-controller being adapted to randomly vary a duty cycle of the transmitter thereby reducing a likelihood that two or more portable transceivers will try to transmit simultaneously.

10. The portable transceiver according to claim 9, wherein the micro-controller is adapted to randomly vary initiation of said transmission within said duty cycle of the transmitter thereby reducing a likelihood that two or more portable transceivers will try to transmit simultaneously.

11. A reader for sending a message using IR data communication to a portable transceiver, said reader comprising:

a receiver for receiving a transmission of a data packet from the portable transceiver, and a transmitter for sending the message to the portable transceiver during a time window opened thereby;

wherein the transmitter is responsive to the received data packet from the portable transceiver for sending said message and is thus incapable of initiating autonomous communication with the portable transceiver.

12. The reader according to claim 11, further including:

a signal strength indicator and detector for measuring a received signal strength, a noise subtract unit coupled to the signal strength indicator and detector, a noise integrator coupled to an output of the signal strength indicator and detector for producing a noise signal representative of average noise, a summing amplifier having a first input coupled to an output of the noise integrator and having a second input coupled to a noise threshold for producing at an output thereof an output signal corresponding to the sum of the average noise and the noise threshold, a comparator having an inverting input coupled to the output of the summing amplifier and a noninverting input coupled to the signal strength indicator and detector for producing an output signal only if the received signal strength exceeds the sum of the average noise and the noise threshold.

13. The reader according to claim 11, further including:

a peak detector coupled to the signal strength indicator and detector for measuring a peak value of the signal strength, a summing amplifier having a first, summing input coupled to the output of the peak detector and having a second, subtracting input connected to a noise threshold for producing at an output of the summing amplifier a signal corresponding to the difference between the peak value of the RSSI signal and the threshold, a comparator having an inverting input coupled to the output of the summing amplifier and having a non-inverting input coupled to the amplifier and detector for producing at an output thereof an output signal only if the signal strength of the received signal exceeds the difference between the peak value of the received signal strength and the threshold, and a deglitcher coupled to the output of the comparator for suppressing any pulse whose time duration is less than a predetermined time period and thus constitutes spurious glitches rather than actual data.

14. A system comprising:

a plurality of portable transceivers adapted for bi-directional IR data communication with a reader;

each portable transceiver comprising:

a motion sensor for producing a motion detect signal upon movement of the portable transceiver, a transmitter coupled to the motion sensor for transmitting successive data packets to the reader at a rate that is dependent on whether the portable transceiver is stationary or moving;

each reader comprising:

a receiver for receiving a transmission of a data packet from the portable transceiver, and a transmitter for sending the message to the portable transceiver during a time window opened thereby;

wherein each portable transceiver further comprises:

a timer responsive to termination of a transmission of each of said data packets, for opening a time window for receiving a transmission from the reader, and a receiver for receiving messages only during said time window;

the transmitter in each reader is responsive to the received data packet from the portable transceiver for sending said message and is thus incapable of initiating autonomous communication with the portable transceiver; and a server is connected to the readers and is adapted to receive and monitor the transmissions of the portable transceivers.

15. In the system according to claim 14, a method for communicating between a reader and a portable transceiver, said method comprising the following steps carried out by the server:

(a) locating a respective one of said readers in communication with the portable transceiver, and (b) redirecting the message to the respective reader for onward transmission to the portable transceiver during a time window opened thereby.

16. In the system according to claim 15, a method for communicating between a reader and a portable transceiver, said method comprising the following steps:

(a) the portable transceiver initiating transmissions of successive data packets to the reader at a rate that is dependent on whether the portable transceiver is stationary or moving, said data packets including an acknowledge signal where appropriate for acknowledging receipt of a message from the reader during a preceding communication cycle, (b) upon termination of a transmission of each of said data packets, the portable transceiver opening a time window for receiving a message from the reader and enabling reception of data therein, (c) upon termination of said time window, the portable transceiver disabling reception of data so as to conserve battery power, decoding said message and, if necessary, executing any instructions embedded in said message, (d) upon receipt of a data packet from the portable transceiver by one of the readers, the reader decoding the data packet and conveying to the server, (e) if a message is to be conveyed to the portable transceiver, the reader transmitting said message within said time window so as to be received by the portable transceiver, (f) reverting to "receive" mode upon termination of said time window for receiving subsequent data packets from the portable transceiver.

17. The method according to claim 16, wherein in step (a) there is included the step of:

adapting each portable transceiver to transmit for a negligible fraction of its duty cycle thereby reducing a likelihood that two or more portable transceivers will try to transmit simultaneously.

18. The method according to claim 16, wherein in step (a) there is included the step of:

adapting each portable transceiver to transmit for a randomly variable duty cycle thereby reducing a likelihood that two or more portable transceivers will try to transmit simultaneously.

19. The method according to claim 16, wherein in step (a) there is included the step of:

adapting each portable transceiver to initiate said transmission at a randomly varying time within a duty cycle of the transmitter thereby reducing a likelihood that two or more portable transceivers will try to transmit simultaneously.

* * * * *